(12) United States Patent
Ginter et al.

(10) Patent No.: US 10,805,462 B1
(45) Date of Patent: Oct. 13, 2020

(54) TECHNIQUES FOR PROVIDING SOS CALL ROUTING FOR EMERGENCY CALLS

(71) Applicant: Bandwidth, Inc., Raleigh, NC (US)

(72) Inventors: Thomas Ginter, Allen, TX (US); Daniel C. Tolbert, Raleigh, NC (US)

(73) Assignee: Bandwidth, Inc., Raleigh, NC (US)

( * ) Notice: Subject to any disclaimer, the term of this patent is extended or adjusted under 35 U.S.C. 154(b) by 0 days.

(21) Appl. No.: 16/941,025

(22) Filed: Jul. 28, 2020

(51) Int. Cl.
  *H04M 11/04* (2006.01)
  *H04M 3/51* (2006.01)
  *H04L 29/08* (2006.01)

(52) U.S. Cl.
  CPC .......... *H04M 3/5116* (2013.01); *H04L 67/12* (2013.01)

(58) Field of Classification Search
  CPC .................................................. H04M 3/5116
  See application file for complete search history.

(56) References Cited

U.S. PATENT DOCUMENTS

| | | | | |
|---|---|---|---|---|
| 10,582,343 | B1* | 3/2020 | Patton | H04W 4/90 |
| 2017/0310827 | A1* | 10/2017 | Mehta | H04M 3/42357 |
| 2019/0391227 | A1* | 12/2019 | Zhang | G01S 5/0284 |
| 2020/0187150 | A1* | 6/2020 | Eisner | H04W 4/029 |

\* cited by examiner

Primary Examiner — John D Blanton
(74) Attorney, Agent, or Firm — Gregory Stephens

(57) ABSTRACT

Techniques for providing SOS call routing for emergency calls are disclosed. One example system includes a first computing device that receives a message including identification information from a telephony endpoint; and retrieves location information for an IoT device based on the message. The system includes a second computing device that receives a call from the telephony endpoint that includes call information. The first computing device receives a notification of the call from the second computing device that includes the call information; verifies the call is associated with the message based on the identification information and call information; and generates instructions for the second computing device that includes forwarding the call using the location and callback information to a public safety answering point (PSAP). The second computing device receives the instructions from the first computing device and forwards the call with the emergency information to the PSAP, which services a location of the IoT device.

20 Claims, 7 Drawing Sheets

… (1) …

TECHNIQUES FOR PROVIDING SOS CALL ROUTING FOR EMERGENCY CALLS

TECHNICAL FIELD

The present disclosure relates generally to emergency call routing within a network. More specifically, but not by way of limitation, the present disclosure relates to providing "save our souls" (SOS) call routing for emergency calls in a communications network.

BACKGROUND

Client devices or end user devices utilizing wireless communication protocols are ubiquitous. Many client devices or telephony endpoints operate using the Voice over Internet Protocol (VoIP) standard. VoIP telecommunications differs from the legacy circuit-switched telephony systems in many ways. One difference is the ability for a VoIP telephony endpoint to be mobile, whereas a circuit-switched telephony endpoint uses a fixed, known location. When a circuit-switched telephony endpoint makes an emergency call (e.g., a 911 call), the location of the telephony endpoint (and therefore the caller) is known because that telephony endpoint has been assigned a physical address that is stored, e.g., in a database. The physical addresses can be used by an emergency dispatcher located in a Public Safety Answering Point (PSAP) to send aid directly to the caller.

SUMMARY

Various embodiments of the present disclosure relate to techniques for providing SOS call routing for emergency calls in a communications network. One example computing system includes a plurality of computing devices, each computing device comprising: a non-transitory computer-readable medium; and a processor in communication with the non-transitory computer-readable medium, the processor configured to execute instructions stored in the non-transitory computer-readable medium, wherein the plurality of computing devices are collectively configured to: receive, by a first computing device of the plurality of computing devices, a SOS message from a telephony endpoint, the SOS message comprising identification information associated with the telephony endpoint; retrieve, by the first computing device, location information associated with an Internet of things (IoT) device based on the SOS message; receive, by a second computing device of the plurality of computing devices, a telephone call from the telephony endpoint, the telephone call comprising call information; receive, by the first computing device and from the second computing device, a notification of the telephone call from the telephony endpoint, the notification comprising the call information associated with the telephone call; verify, by the first computing device, the telephone call is associated with the SOS message based on the identification information and the call information; and upon verification, generate, by the first computing device, instructions for the second computing device, wherein the instructions include forwarding the telephone call to a public safety answering point (PSAP), and wherein the telephone call includes emergency information comprising the location information associated with the IoT device and callback information associated with the IoT device; receive, by the second computing device, the instructions from the first computing device; and forward, by the second computing device, the telephone call with the emergency information to the PSAP, wherein the PSAP services a location associated with the IoT device.

One example method includes receiving, by a first computing device of a plurality of computing devices, a SOS message from a telephony endpoint, the SOS message comprising identification information associated with the telephony endpoint; retrieving, by the first computing device, location information associated with an IoT device based on the SOS message; receiving, by a second computing device of the plurality of computing devices, a telephone call from the telephony endpoint, the telephone call comprising call information; receiving, by the first computing device and from the second computing device, a notification of the telephone call from the telephony endpoint, the notification comprising call information associated with the telephone call; verify, by the first computing device, the telephone call is associated with the SOS message based on the identification information and the call information; generating, by the first computing device, instructions for the second computing device, wherein the instructions include forwarding the telephone call to a PSAP, and wherein the telephone call includes emergency information comprising the location information associated with the IoT device and callback information associated with the IoT device; receiving, by the second computing device, the instructions from the first computing device; and forwarding, by the second computing device, the telephone call with the emergency information to the PSAP.

One example non-transitory computer-readable medium includes program code executable by a processor to cause the processor to: receive a SOS message from a telephony endpoint, the SOS message comprising first location information and identification information associated with a telephony endpoint; retrieve location information associated with an IoT device based on the SOS message; receive a notification of a telephone call from the telephony endpoint, the notification comprising call information associated with the telephone call; verify the telephone call is associated with the SOS message based on the identification information and the call information; upon verification, generate instructions for a remote computing device, wherein the instructions include forwarding the telephone call to a PSAP, and wherein the telephone call includes emergency information comprising the location information associated with the IoT device and callback information associated with the IoT device; and transmit the instructions to the remote computing device.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the examples, serve to explain the principles and implementations of the certain examples.

DETAILED DESCRIPTION

Figure 1:
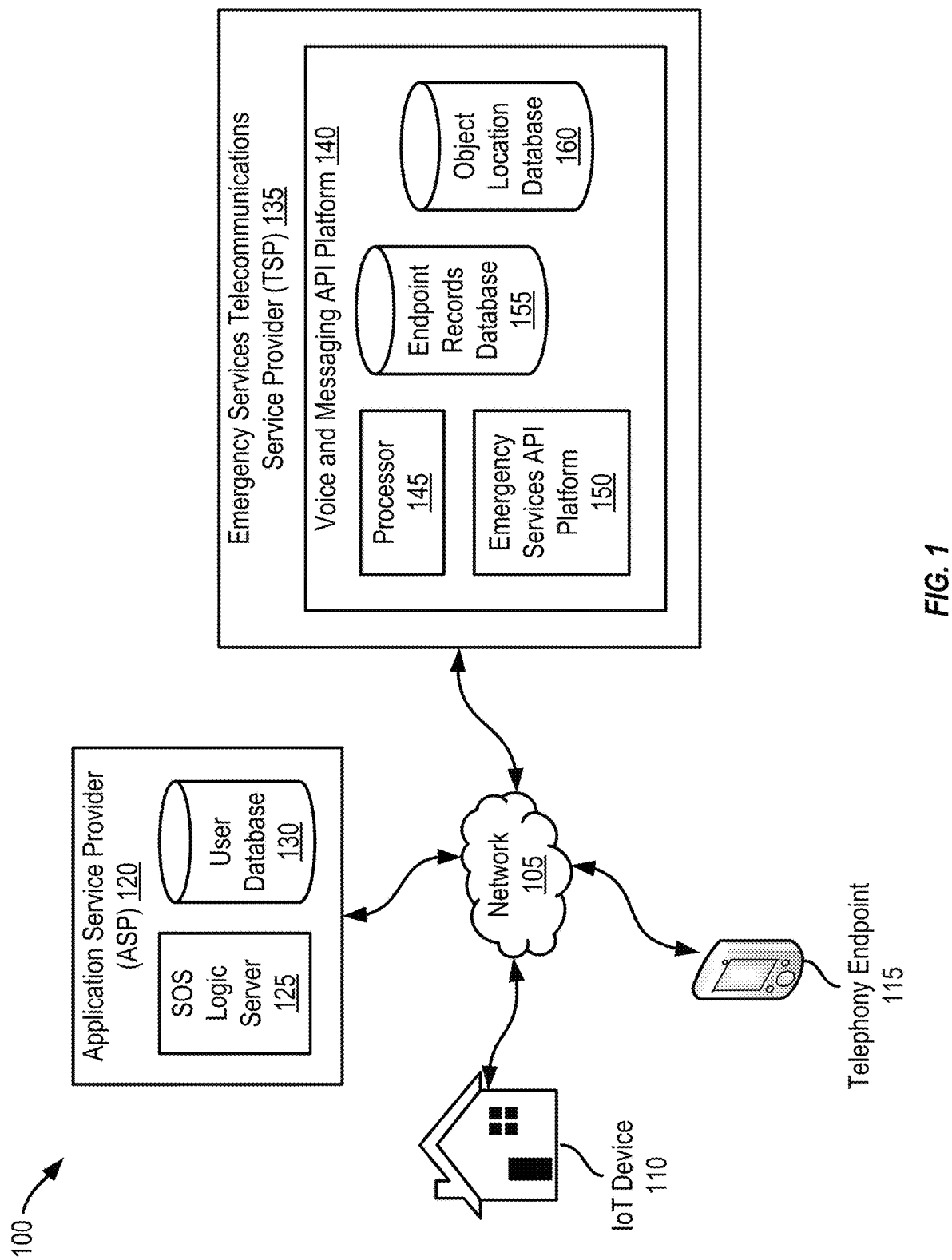
FIG. 1 shows an example system for provisioning emergency services for providing SOS call routing for emergency calls according to this disclosure.

Certain aspects and features of the present disclosure involve techniques for providing SOS call routing for emergency calls in a communications network with which a user may send or receive messages and make phone calls. Some example systems can provide SOS call routing for emergency calls using a client device or a telephony endpoint. Further, some example techniques can provide SOS call routing for emergency calls, using more accurate location information, which can be delivered to PSAP dispatchers via a communications network. This increase in accuracy of location information can reduce an amount of time for first responders to provide aid to those in need.

The description of illustrative examples are provided merely examples, not to limit or define the limits of the present subject matter. Various examples are described herein and variations of such examples would be understood by one of skill in the art. Advantages offered by various examples may be further understood by examining this specification and/or by practicing one or more examples of the claimed subject matter.

Users frequently use their mobile devices to send and receive messages and/or calls. These mobile devices can include numerous software applications that allows users to communicate with networked users or entities, e.g., via the Internet. In an emergency, a user may need to call to request emergency services, e.g., from a law enforcement agency (LEA), fire department, emergency medical services (EMS), hazardous materials (HAZMAT) response team, etc. Some users can make the call using a telecommunications service provider (TSP). The TSP may include an emergency services TSP, wireless service provider (WSP), Internet service provider (ISP), VoIP service provider (VSP), etc. In one example, a WSP can assign a unique call back number (CBN) to the mobile device (e.g., a smartphone).

In this example, the user has a smartphone that includes a registered CBN with the WSP and one or more additional, IP-enabled client devices. The user may be enjoying a software application (e.g., a video game) on their smartphone when an emergency situation occurs. The user can press a SOS button (e.g., a real or virtual button) on the smartphone while playing the video game. The SOS button triggers an application programming interface (API) that causes SOS call routing for emergency services in a communications network. For example, when the user presses the SOS button, the smartphone uses the API to send a SOS message to an application provider (e.g., via a SOS logic server). The SOS message may include a notification that provides an alert for an impending inbound call from a telephony endpoint (e.g., the smartphone). The SOS message causes the smartphone to place (e.g., make or initiate) an emergency call to an emergency service number (ESN).

The WSP receives the call and can transmit call information to the SOS logic server, which receives and verifies the call information from the WSP by matching information associated with the SOS message. Upon verification, the SOS logic server transmits instructions to the WSP. Further, the SOS logic server may transmit instructions that include emergency information. In one example, the instructions include forwarding the call with the emergency information to the WSP.

The WSP receives the instructions and determines a destination PSAP based on the emergency information, which may include location data associated with one of the user's client devices. The WSP forwards the call to the PSAP based on the emergency information, e.g., using the location data of the client device. Further, the PSAP receives the call with the emergency information and displays the emergency information on a display device that is accessible by a dispatcher.

The dispatcher can dispatch an emergency service provider to one or more locations based on the emergency information and/or the call. For example, the dispatcher may determine emergency services are needed at a location associated with the SOS message based on the emergency information. The dispatcher can send instructions to the emergency service provider to respond to an emergency at the location for the client device. The dispatcher may also determine the caller on the call needs emergency services. The dispatcher may also use call information to dispatch emergency services to a location of the smartphone.

Some example systems described herein can provide SOS call routing for emergency calls with certain advantages over existing systems. For example, some systems can provide more accurate location information to PSAP dispatchers during an emergency call. Accurate location information is mission critical information for first responders en route to deliver aid to those in need. Since VoIP telephony endpoints can move and operate virtually anywhere an Internet connection is available, there is a need for accurate location information during emergency calls. Other advantages of the present disclosure may include providing, to a PSAP dispatcher, a registered address on file for a customer, location data associated with a SOS message, presence information for a device, etc., or a combination of these. Providing accurate, up-to-date location data to PSAP dispatchers can increase timeliness and efficacy of responses to emergency calls.

These illustrative examples are mentioned not to limit or define the scope of this disclosure, but rather to provide examples to aid understanding thereof. Illustrative examples are discussed in this detailed description, which provides further description. Advantages offered by various examples may be further understood by examining this specification.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

With general reference to notations and nomenclature used herein, one or more portions of the detailed description above or which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations require physical manipulations of physical quantities. Usually, though not necessarily, these quantities take the form of electrical, magnetic, or optical signals capable of being stored, transferred, combined, compared, or otherwise manipulated. It proves convenient at times, principally for reasons of common usage, to refer to these signals as bits, values, elements, symbols, characters, terms, or numbers. It should be noted, however, that all of these and similar terms are to be associated with the appropriate physical quantities and are merely convenient labels.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

FIG. 1 shows a block diagram of a system 100 for provisioning services for providing SOS call routing for emergency calls. A communications network 105 may be a combination of wired and/or wireless networks, including without limitation a direct interconnection, secured custom connection, private network (e.g., an enterprise intranet), public network (e.g., the Internet), personal area network (PAN), local area network (LAN), metropolitan area network (MAN), operating missions as nodes on the Internet (OMNI), wireless area network (WAN), wireless network (e.g., 802.11 WiFi), cellular network, and other communications networks. The example system 100 includes an Internet of Things (IoT) device 110 that may be an end user device such as a PC, security system or component, heating, ventilation, and air conditioning (HVAC) system or component, automotive device, audio device, smart refrigerator, smart stove, smart television, etc. The example system 100 also includes a telephony endpoint 115 that may be a mobile device such as cell phone, smartphone, laptop, VoIP phone, IoT device, or another telephonic device. The IoT device 110 is in communication with telephony endpoint 115 and an application provider (e.g., application service provider (ASP) 120).

In the example system 100, emergency services telecommunications service provider (TSP) 135 has provisioned services capable of providing emergency services to ASP 120. For example, the emergency services TSP 135 provides an emergency services platform that allows ASP 120 to provision services for SOS call routing during emergency calls. And in this example, a user sends a message via an application that is being executed on telephony endpoint 115 to SOS logic server 125 of the ASP 120 via network 105.

The user-generated message includes a request for the provisioning of support for emergency services from the ASP 120, which includes a customer relationship. For instance, the application provided by the ASP 120 can include service providers for home security (e.g., a home monitoring or alarm service provider), energy management (e.g., a home energy, utility monitoring, alert, automation, or control service provider), home automation (e.g., a smart home, lighting, occupancy, air quality, social media, or entertainment service provider), emergency services TSP 135, ISP, WSP, another application provider, etc.

In some examples, the ASP 120 may include a mobile application provider, a virtual assistant (e.g., an intelligent virtual assistant (IVA), intelligent personal assistant (IPA), chatbot, Amazon's Alexa,™ Apple's Siri,™ Google Assistant,™ Microsoft's Cortana,™ Samsung's Bixby,™ etc.), another third party application, etc. The application may include services for in-vehicle security (e.g., a collision, global positioning system (GPS) navigation, hands-free, social media, entertainment, remote diagnostics, accident, or another emergency service provider), medical provider (e.g., a personal emergency response system (PERS) or medical alert service provider), subscription services, or another service provider.

In this example, the user is a new customer of ASP 120. To enable support, the ASP 120 provisions emergency services to the user for the IoT device 110 and telephony endpoint 115, e.g., using SOS logic server 125. The SOS logic server 125 provides the telephony endpoint 115 with an API that integrates messaging functions in the application. Messaging APIs (e.g., short message service (SMS) APIs, multimedia message service (MMS) APIs, representational state transfer (REST) APIs, etc.) enable a number of functions, such as sending and receiving various information, messages, notifications, text, pictures, audio, videos, software updates, etc. The telephony endpoint 115 uses the messaging API to send information associated with the request to the ASP 120.

The request from telephony endpoint 115 includes information about the user (e.g., customer information). The user can enter customer information into the application via a graphical user interface (GUI). Customer information may include authentication information for the customer account such as a personal identification number (PIN), username, user ID, passcode, password, other user information, etc. In some examples, the customer information include more than one new device to be added to the customer account. For example, customer information may include device information for both the telephony endpoint 115 and the IoT device 110. Further, the ASP 120 can use customer information (e.g., authentication information) to verify ownership of the customer account for future requests.

The ASP 120 receives the new customer request for support for emergency services via the SOS logic server 125, e.g., by executing a SOS application. The SOS application includes functions supported by an API platform (e.g., voice and messaging API platform 140), which provides application developers access to software creation tools capable of interactivity with other applications in the API platform. The API platform may also include access to shared data among applications. The SOS logic server 125 provisions access to the emergency services.

For example, SOS logic server 125 provisions a new customer account by adding emergency service capabilities to customer devices (e.g., IoT device 110 and telephony endpoint 115). The SOS logic server 125 assigns a unique alternate end user identification (AEUI) to the new customer account. For example, the AEUI may be a unique numeric or alphanumeric string assigned to the new customer account. Further, SOS logic server 125 provisions unique, location-based identifiers for customer devices. The SOS logic server 125 can provisions a location-based identifier (e.g., a location object (LO)) for each customer device (e.g., IoT device 110 and telephony endpoint 115).

In some examples, the unique identifier can include a device identification (ID) or other information. For example, a LO provisioned by the SOS logic server 125 may include a particular format or specific location information. For example, the LO may be a presence information data format location object (PIDF-LO), which can include extensible markup language (XML) data according to Internet engineering task force (IETF) standards. The PIDF-LO may also include an XML representation of a civic address or location for a customer device (e.g., IoT device 110 or telephony endpoint 115), hypertext transfer protocol (HTTP) data, a geography markup language (GML) representation, XML tag, or other location data. Some LOs can be used to identify a device or caller based on a message or a call. Further, various location information may be updated at regularly-scheduled intervals. In this example, the SOS logic server 125 provisions and stores the new customer account with the AEUI and/or LOs in a user database 130.

The ASP 120 requests the provisioning of new endpoint records from the emergency services TSP 135. For example, SOS logic server 125 sends a request for new endpoint records to voice and messaging API platform 140 using customer information for the new customer account, e.g., via network 105. The voice and messaging API platform 140 shown in FIG. 1 includes several components, including processor 145, emergency services API 150, endpoint records database 155, and object location database 160. In some examples, the components of the voice and messaging API platform 140 may be hardware devices, but in some examples, each of the components of the voice and messaging API platform 140 includes one or more software applications or virtual machines executed by one or more processors 145.

In this example, emergency services TSP 135 receives the request to provision endpoint records from the ASP 120, for example, using voice and messaging API platform 140. The voice and messaging API platform 140 uses processor 145 to determine the request is a provisioning request that includes the AEUI for the customer account and additional customer information. In some examples, the provisioning request may include the AEUI, LOs, customer information, or other user information. Customer information or other user information may include, e.g., a user profile, customer name, device ID, contact information, mailing address, CBN, personal information, usage data, level of service, authentication information, billing information, account information, etc.

The voice and messaging API platform 140 uses processor 145 to execute the emergency services API 150, which can provision endpoint records for customer accounts. For instance, the emergency services API 150 creates a customer account that includes new endpoint records such as a unique identifier, customer information, customer devices, etc. Once provisioned by the emergency services API 150, the voice and messaging API platform 140 can store the new endpoint records in endpoint records database 155. In some examples, emergency services API 150 may include endpoint records database 155, object location database 160, or both.

In one example, the emergency services API 150 provisions services for the customer account by creating the emergency calling account with unique logon credentials. The emergency services API 150 can provision the emergency calling account using a uniform resource identifier (URI) or a uniform resource locator (URL). The emergency services API 150 provisions the endpoint records (e.g., a phone number, customer name, etc.) within the emergency calling account and stores these endpoint records in the endpoint records database 155. The emergency services API 150 provisions LOs, which is stored in object location database 260.

In some examples, the emergency services API 150 can request and receive customer information from the telephony endpoint 215. The emergency services API 150 can obtain the customer information in response to a SOS message or during a SOS call. Further, emergency services API 150 can use customer information to verify the customer account, e.g., by retrieving endpoint records that include customer information associated with the customer account.

In some examples, the user may be an existing customer of the ASP 120. An existing customer can request to add a new customer device to the customer account. In response, the SOS logic server 125 may send a request for customer information to telephony endpoint 115. The request for customer information may include a request for authentication information. The SOS logic server 125 can receive requested authentication information and verify ownership of the customer account, e.g., using customer information, authentication information, or a customer account stored retrieved from user database 130. Further, the SOS logic server 125 may determine whether telephony endpoint 115 is authorized or enabled to receive services, add services, add a device, etc. Once authenticated, the existing customer can add the new customer device to the customer account via the application. The SOS logic server 125 modifies the customer account, for example, by updating the customer information stored in the user database 130.

In some examples, a user request for support for emergency services may be missing customer information required for provisioning services. For example, SOS logic server 125 may receive a request for a new customer that does not include sufficient user information or device-specific information to create the customer account. In either case, the SOS logic server 125 can request additional user information necessary to provision the new customer account. For instance, the SOS logic server 125 can send a message or notification to the requesting user that the customer account could not be created without the additional user information. The user can enter and transmit the additional user information to the SOS logic server 125 using the application. The SOS logic server 125 can provision the new customer account, services, or devices with the additional user information.

Once provisioned, the user is a registered customer of the ASP 120 and can use the application to request emergency services. For example, the user may request emergency services, via the application, from public safety agencies that provide law enforcement, fire services, EMS, etc. In some examples, the user may be a customer of both the ASP 120 and the emergency services TSP 135.

In some examples, the user may want to test their emergency services. For example, the user may be a new customer of ASP 120. The new customer may desire to test newly acquired services for their present location by familiarizing themselves with the application. The user can access the application via telephony endpoint 115 and send a test emergency message to ASP 120. Some customers may test emergency services for a new device, location, address, service, etc.

In this example, the customer sends a request to the ASP 120 to test their emergency services capabilities using the application executed on telephony endpoint 115, e.g., to confirm operability of a device, connectivity to ASP 120 or emergency services TSP 135, emergency services capabilities, etc. In this example, the customer selects an option to test the emergency services by pressing a SOS button. Further, the customer may press the SOS button in a different manner to indicate the request is a test request (e.g., a long button press, multi-touch button press, pattern, gesture, etc.). The test request may trigger a test call from telephony endpoint 115, which may include a customer-selected option that dials a SOS number (e.g., an ESN such as 9-1-1, 9-3-3, E-911, 9-9-9, etc.).

The trigger may include an API call to initiate the test call, e.g., which may be sent from the IoT device 110 (e.g., in response to a sensor signal) or from SOS logic server 125 (e.g., in response to the SOS message). For instance, the SOS logic server 125 can send the API call based on a user selection, preference, profile, default setting, etc. A triggered test call may dial a phone number of ASP 120, emergency services TSP 135, an emergency contact (e.g., an in case of emergency (ICE) contact), or another contact. The user may also initiate the test call by manually dialing the ESN (e.g., test number 933) from telephony endpoint 115.

The SOS logic server 125 receives the test request from the telephony endpoint 115 and generates emergency information. Emergency information may include, e.g., location information, a type of emergency, name, age, gender, type of a residence (e.g., a single-family house, apartment, nursing home, etc.), or other relevant information. The SOS logic server 125 can generate a test message with the emergency information, e.g., that includes a notification or alert. The SOS logic server 125 can send the test message to the IoT device 110, telephony endpoint 115, voice and messaging API platform 140, etc.

The telephony endpoint 115 calls the ESN 933, e.g., via voice and messaging API platform 140, in response to the trigger. The voice and messaging API platform 140 receives the test call from the telephony endpoint 115 in parallel to the test message from the SOS logic server 125. For example, the voice and messaging API platform 140 determines a type of the call is a test call based on test information included in the test message from the SOS logic server 125. In some examples, the telephony endpoint 115 includes test information in the test call, which may include a notification, alert, header, message, etc. The voice and messaging API platform 140 receives the inbound test call from telephony endpoint 115 and determines the type of the call is a test call based on the test information.

In some examples, voice and messaging API platform 140 generates and transmits an acknowledgement (ACK) message to the SOS logic server 125 based on the test call from the telephony endpoint 115. The SOS logic server 125 receives the ACK message and transmits the emergency information described above to the voice and messaging API platform 140. In some examples, the emergency information includes a request to confirm connectivity with the PSAP.

The voice and messaging API platform 140 receives the emergency information with the request for a confirmation of connectivity with PSAP. The voice and messaging API platform 140 can verify connectivity by testing the connection, e.g., by pinging or otherwise contacting the PSAP, in response to the confirmation request. Further, the voice and messaging API platform 140 can send a confirmation message to the SOS logic server 125 with the results of the connectivity test.

The voice and messaging API platform 140 can determine whether the PSAP is IP-enabled in response to certain confirmation requests, e.g., by requesting capability information from the PSAP. The voice and messaging API platform 140 can request capability information from PSAP that indicates which National Emergency Number Association (NENA) standard the PSAP uses (e.g., an interim standard for VoIP architecture for E-911 services (i2) or a standard for VoIP architecture for next generation 911 (NG-911) services (i3)). If the PSAP indicates the NENA i3 standard is used, the voice and messaging API platform 140 determines the PSAP is IP-enabled (e.g., can receive PIDF-LOs). But if the PSAP uses the NENA i2 standard, the voice and messaging API platform 140 determines the PSAP is a legacy PSAP that is not IP-enabled. The voice and messaging API platform 140 can transmit a message to SOS logic server 125 indicating the capability of the PSAP (e.g., using an ACK or negative acknowledgement (NACK) message, indicating an inclusion or lack of IP-enablement).

The voice and messaging API platform 140 transmits a confirmation message to the SOS logic server 125 (e.g., indicating connectivity with the PSAP is active and IP-enabled). The SOS logic server 125 can generate the test message with test results for the confirmation request, which may include a user notification or alert that indicates results for the emergency test request. Further, the SOS logic server 125 can send a copy of the test message to IoT device 110, telephony endpoint 115, user database 130, voice and messaging API platform 140, etc.

Figure 2:
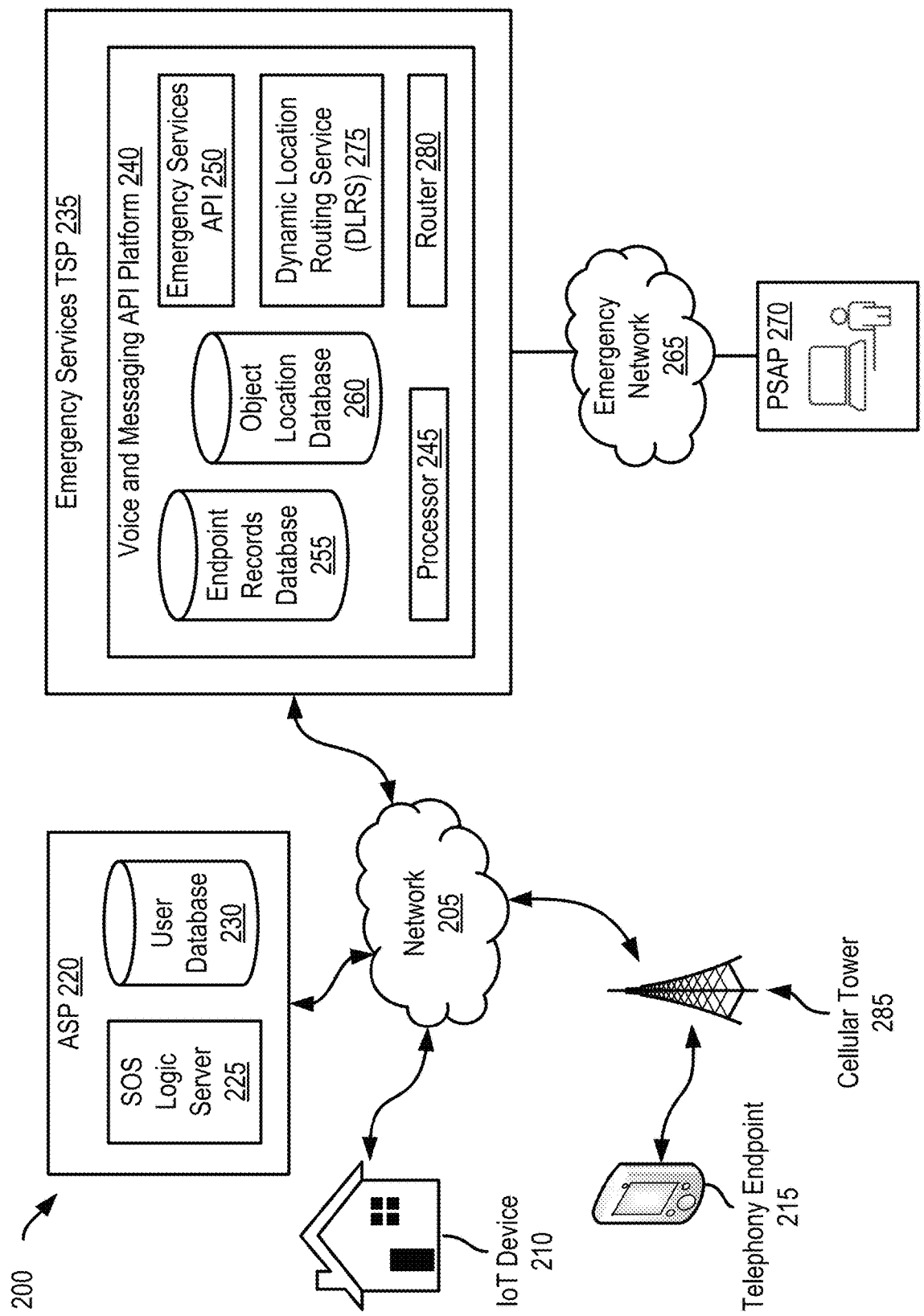
FIG. 2 shows an example system for providing SOS call routing for emergency calls according to this disclosure.

Referring now to FIG. 2, which shows an example system 200 for providing SOS call routing for non-emergency calls according to this disclosure. The system 200 includes telephony endpoint 215 that can send SOS messages and make calls to an emergency services TSP 235, which may be any telephonically enabled device described above with respect to FIG. 1 (e.g., telephony endpoint 115). The voice and messaging API platform 240 includes processor 245, emergency services API 250, endpoint records database 255, and object location database 260. In some examples, each of the components shown in system 200 may perform substantially similar functions to those described above with respect to similar counterpart components described in FIG. 1.

But in this example, voice and messaging API platform 240 includes a dynamic location routing service (DLRS) 275. Further, the voice and messaging API platform 240 includes a router 280 and the telephony endpoint 215 is in wireless communication with the voice and messaging API platform 240 via cellular tower 285 and network 205. The cellular tower 285 may include one or more cell sites including without limitation base stations, antennae, masts, mounts, transceivers, digital signal processors, GPS receivers, structures, power sources, and other cellular devices. The emergency services TSP 235 is communicatively coupled to PSAP 270 via emergency network 265.

In one example, system 200 determines an incoming call for emergency services is a non-emergency call. For example, the emergency services TSP 235 receives a call, using voice and messaging API platform 240, that appears to be from telephony endpoint 215. In some examples, voice and messaging API platform 240 may include a stand-alone voice network capable of receiving the call from the telephony endpoint 215. During the call, the emergency services API 250 can request emergency information from the SOS logic server 225.

The emergency services API 250 can authenticate a customer account associated with telephony endpoint 215 using the emergency information, which may include, e.g., a CBN, registration information, location information, customer information, a type of the telephony endpoint 215, etc. The voice and messaging API platform 240 can use DLRS 275 to analyze the emergency information obtained by emergency services API 250 and call information from telephony endpoint 215 to determine whether the call is a non-emergency call.

For example, the voice and messaging API platform 240 may prevent undesirable robocalls. Robocalls are automated calls from third parties that often seek to obtain an end user's personal information, sell goods or services, deceive end users, proffer fraudulent or otherwise illegal offers (e.g., scam calls, toll fraud, SPAM, etc.), etc. Some robocalls include spoofed calls that seek to avoid detection by spoofing (e.g., disguising) their source. Further, robocalls may attempt to place calls by spoofing legitimate CBNs (e.g., for a registered customer account). The voice and messaging API platform 240 can receive a call that appears to be from telephony endpoint 215, e.g., that dialed an ESN or another emergency number.

In this example, the call is a non-emergency call that is not a test call. The SOS logic server 225 can receive a notification of the call from the voice and messaging API platform 240 and determine the type of the call is a non-emergency call. For example, the SOS logic server 225 may use call information from the voice and messaging API platform 240 to determine the call is a robocall, test call, pocket dial, misdial, false alarm, nuisance call, or another type of non-emergency call.

In some examples, SOS logic server 225 may use the call information from the voice and messaging API platform 240 to determine the type of the call is a robocall, e.g., based on call features. For instance, SOS logic server 225 can determine the type of the call is a robocall based on a presence of an automated voice (e.g., using voice or speech recognition software), unrecognized or unknown third party information, unauthorized device, origination location, or a combination of these. Further, the SOS logic server 225 can determine the type of the call is a robocall using call information or a caller ID from a previous robocall.

For example, the SOS logic server 225 can determine the call includes a spoofed phone number. The SOS logic server 225 may determine the call includes a legitimate CBN registered to a customer account. The SOS logic server 225 may also determine the CBN does not match customer information for the customer account (e.g., an automatic number identification (AND, device ID, DNIS, etc. for telephony endpoint 215). Thus, the SOS logic server 225 can determine the call originated from a spoofed phone number. Further, the SOS logic server 225 can use location information for telephony endpoint 215 to determine a CBN is spoofed.

In some examples, the SOS logic server 225 may determine the type of the call is a non-emergency call based on the presence or absence of certain information, such as emergency information. The SOS logic server 225 may request emergency information from telephony endpoint 215 based on the absence of the emergency information. The SOS logic server 225 can use a response to the request to verify or otherwise authenticate the call. The SOS logic server 225 can determine the type of the call is a non-emergency call or robocall based on the absence of the emergency information or an error message from telephony endpoint 215.

The SOS logic server 225 may determine the non-emergency call should be rejected. In some examples, SOS logic server 225 may determine the non-emergency call should be rejected based on a particular type of the non-emergency call. For example, the SOS logic server 225 may determine a robocall using a spoofed CBN should be rejected based on the type of the non-emergency call. Further, the SOS logic server 225 may generate a call record for the robocall, which can be stored in the user database 230. The SOS logic server 225 can also transmit the call record with a recommendation to reject the call to voice and messaging API platform 240.

In some examples, voice and messaging API platform 240 stores a record of the non-emergency call, which may include the type of the non-emergency call. For example, the voice and messaging API platform 240 can store the record of the non-emergency call by distinguishing call records for robocalls, test calls, pocket dials, misdials, false alarms, nuisance calls, or another suitable classification of the call. The voice and messaging API platform 240 transmit the call record to the SOS logic server 225, which may include the classification or type. Further, the voice and messaging API platform 240 may transmit the call record to client device 310, telephony endpoint 315, user database 230, another customer device, etc.

In some examples, the ASP 220 can receive an SOS message for emergency services from telephony endpoint 215. For example, a user can press an SOS button or use another user interaction (e.g., a voice command, multi-touch input, a touch gesture, a gesture in real space, etc.) to send the SOS message to the ASP 220 via SOS server 225. In this example, the SOS message includes a notification for an impending or eminent inbound call from telephony endpoint 215.

The SOS message includes the notification and customer information. Customer information can include location information, such as a LO, PIDF-LO, XML data, GML data, civic address, geodetic coordinates, geodetic shapes, other geodetic datum, HTTP data, XML tag, other location information, etc. Further, location information may include an automatic location identification (ALI), dialed number information service (DNIS) address, geolocation, geotag, geo uniform resource identifier (geo URI), geo short message service (geoSMS), geo uniform resource locator (geoURL), tag, metadata, etc. The SOS logic server 225 identifies the user as an authorized customer of the requested emergency services based on customer information. Further, the SOS logic server 225 can retrieve additional customer information from user database 230. The SOS message may also include one or more requested emergency services.

The SOS logic server 225 receives the notification of the impending call from telephony endpoint 215, which includes an emergency call to an ESN. The notification may include customer information, location information, user-generated messages, etc. In some examples, SOS messages can include different types of notifications. Further, a notification may include customer information such as a customer name, address, location information, CBN, AEUI, ANI number, DNIS name, billing information, authentication information, etc. The notification may also include a user-generated message, e.g., a text, SMS, MMS, iMessage,™ another type of message, picture, image, voice or audio recording, video recording, etc. Further, the notification may include notification information that includes instructions to send an API call to telephony endpoint 215. For example, notification information may include a CBN, callback information, registration number, location information, customer information, a type of the telephony endpoint 215 (e.g., a type of phone, model, serial number, VoIP phone, landline, etc.), etc.

In some examples, telephony endpoint 215 receives the SOS message from IoT device 210. The telephony endpoint 215 makes a call to a SOS number (e.g., the ESN) based on a copy of the SOS message. For example, telephony endpoint 215 may determine a particular ESN to call based on a type of emergency, user-selected preference, relative location (e.g., between the telephony endpoint 215 and the IoT device 210, PSAP 270, cellular tower 285, emergency service provider, etc.), etc. Further, telephony endpoint 215 may call an emergency contact or the ASP 220, e.g., based on instructions included in notification information for the SOS message.

The voice and messaging API platform 240 receives the call from the telephony endpoint 215, which may include emergency information with the call. For example, the emergency information may include customer information, a notification, type of emergency services, location information, etc. In some examples, the voice and messaging API platform 240 receives the call via router 280.

The voice and messaging API platform 240 identifies and transmits call information to the SOS logic server 225, e.g., by identifying call information relevant to the call. For example, relevant call information may include a subset of all of the emergency information associated with the call. Further, relevant information may include a subset of customer information, authentication information, emergency information, notifications, types of the emergency services, or location information. The voice and messaging API platform 240 transmits the call information for the call to the SOS logic server 225. In some examples, emergency services API 250 or DLRS 275 may generate or transmit call information.

The SOS logic server 225 receives the call information and determines whether the call information matches customer information based on the SOS message. For example, the SOS logic server 225 can determine whether the call information includes the same or a subset of the same customer information. In this example, the SOS logic server 225 determines the call information matches customer information, e.g., by determining a match using customer, authentication, emergency, notification, location, other information, etc.

In some examples, SOS logic server 225 determines call information matches notification information by retrieving customer information stored in the user database 230. For instance, the SOS logic server 225 can identify a customer with two-factor verification by performing both—determining a match between inbound call information and notification information and verifying retrieved customer information. Further, the SOS logic server 225 transmits instructions and emergency information to voice and messaging API platform 240 based on a match.

The SOS logic server 225 can generate the emergency information for the call after determining the match, e.g., that may include callback information or other location information associated with the SOS message. The callback information may include location information that is based on a location of IoT device 210, origination point of the SOS message, current location for telephony endpoint 215, registered civic address of the customer account, user-generated location information, etc. In this example, the SOS logic server 225 generates emergency information for the call using the SOS message that includes a subset of information derived from customer information. In some examples, emergency information can include call information, customer information, or both. The SOS logic server 225 can transmit the emergency information with instructions to emergency services API 250, DLRS 275, etc. In this example, the SOS logic server 225 transmits instructions to the voice and messaging API platform 240 to append emergency information to the call.

The voice and messaging API platform 240 receives the instructions and appends the emergency information to the call and transmits the call (e.g., with the appended emergency information) to a destination PSAP 270. In some examples, the processor 245, emergency services API 250, DLRS 275, or the router 280 may receive the emergency information and instructions. The voice and messaging API platform 240 appends the emergency information to the call based on the instructions. The voice and messaging API platform 240 may use the processor 245, emergency services API 250, or DLRS 275 to append the emergency information to the call. In one example, voice and messaging API platform 240 determines the destination PSAP 270 includes NENA i3 compatibility and transmits the emergency call with the emergency information to the PSAP 270.

The PSAP 270 receives the emergency call and the emergency information from the voice and messaging API platform 240 and displays the emergency information to a dispatcher. The dispatcher receives the call, views the emergency information, and can dispatch emergency service providers to locations based on the emergency information and/or call. For example, the dispatcher may determine emergency services are needed at a location associated with the SOS message and sends instructions to an emergency service provider to respond to the location associated with the SOS message.

In some examples, the dispatcher may also determine the caller on the call needs emergency services. In this case, the dispatcher may use emergency information associated with a present location (e.g., a PIDF-LO) of the telephony endpoint 215 to dispatch emergency services. Further, the dispatcher can determine whether the location of the call and the SOS message are the same location or whether emergency services are needed at two separate locations. In response, the dispatcher can dispatch emergency services to either or both locations.

In one example, the ASP 220 is a home security provider (e.g., ASP 220) that has provisioned emergency services (e.g., via a home security application or API) using techniques described herein. The home security provider may provide a home security application in electrical communication with various home devices. These home devices may include IoT devices 210 and/or telephony endpoints 215. Further, the home security provider may also monitor security devices such as door or window locks, door or window sensors, lighting, motion sensors, still or video cameras, glass break sensors, control panels, computing devices, etc.

In this example, the home security provider can receive SOS messages from IoT devices 210 and/or telephony endpoints 215. The home security provider can also automatically trigger and/or send a SOS message to the IoT devices 210, telephony endpoints 215, emergency services TSP 235, etc. For instance, the home security provider may receive a notification from the control panel that includes, e.g., an alert from a glass break sensor while the home security application is armed. In response, the home security provider determines there is an emergency situation and triggers a SOS message that can include a request for a LEA, the civic address of the home, and a location within the home associated with the glass break sensor (e.g., upstairs, northeast basement, or garage window, etc.). The home security provider may send the SOS message to the customer via telephony endpoint 215. Further, an employee of the home security provider may initiate a call to the ESN.

The ASP 220 may be a home automation provider that has provisioned a customer account to the user for emergency services. For example, the home automation provider may monitor for gas leaks, home lockouts, water damage, HVAC failures (e.g., during extreme weather conditions), etc. In some examples, the SOS logic server 225 may send the API call that triggers dialing the emergency services TSP 235 or emergency contact. For example, the home automation provider may include a natural gas sensor coupled to a control panel that detects an unsafe amount of natural gas in the air. In response, the natural gas sensor sends a sensor signal to the control panel that determines the level of natural gas is unsafe and there may be a gas leak. The control panel can automatically send a SOS message to telephony endpoint 215, ASP 220, emergency services TSP 235, etc.

In this example, the ASP 220 receives the SOS message from the control panel via SOS logic server 225. The SOS logic server 225 generates emergency information associated with the SOS message, which may include a user notification or alert. For example, the emergency message may include an alert that states, e.g., "ALERT—NATURAL GAS DETECTED!" The home automation provider can send the emergency information, in a second emergency message, to an emergency provider that includes a request for a fire department response, the civic address of the home, a location within the home of the natural gas sensor, the amount of natural gas sensed (e.g., in parts per million), a time the sensor sensed the elevated amount of natural gas, etc. Further, the home automation provider can trigger a call from telephony endpoint 215 to an ESN or initiate a call to the ESN.

In some examples, the emergency services TSP 235 itself may be the application provider and include ASP 220. For example, the emergency services TSP 235 may also be a WSP that assigned a CBN to a mobile device such as a smartphone (e.g., telephony endpoint 215). The emergency services TSP 235 can provide security, energy management, or home automation services described above. In some examples, a user can send a SOS message that automatically triggers a call from the telephony endpoint 215, which may include automatically dialing an ESN, ASP 220, emergency contact (e.g., a user-selected, preference-based, user-profile-based, ICE, or otherwise previously indicated emergency contact), etc.

In some examples, the DLRS 275 can determine an optimized routing path to connect to the PSAP 270, which may include the LO associated with the telephony endpoint 215. The DLRS 275 can include the LO, routing instructions, or both in a packet header. For instance, the DLRS 275 can generate a packet header (e.g., a session initiated protocol (SIP) header) for the emergency call and appended emergency information. Once the DLRS 275 determines the nearest PSAP 270, the processor 245 can send instructions to the router 280 to transmit the emergency call and its appended emergency information to the PSAP 270. The router 280 sends the emergency call and appended emergency information to the PSAP 270.

Figure 3:
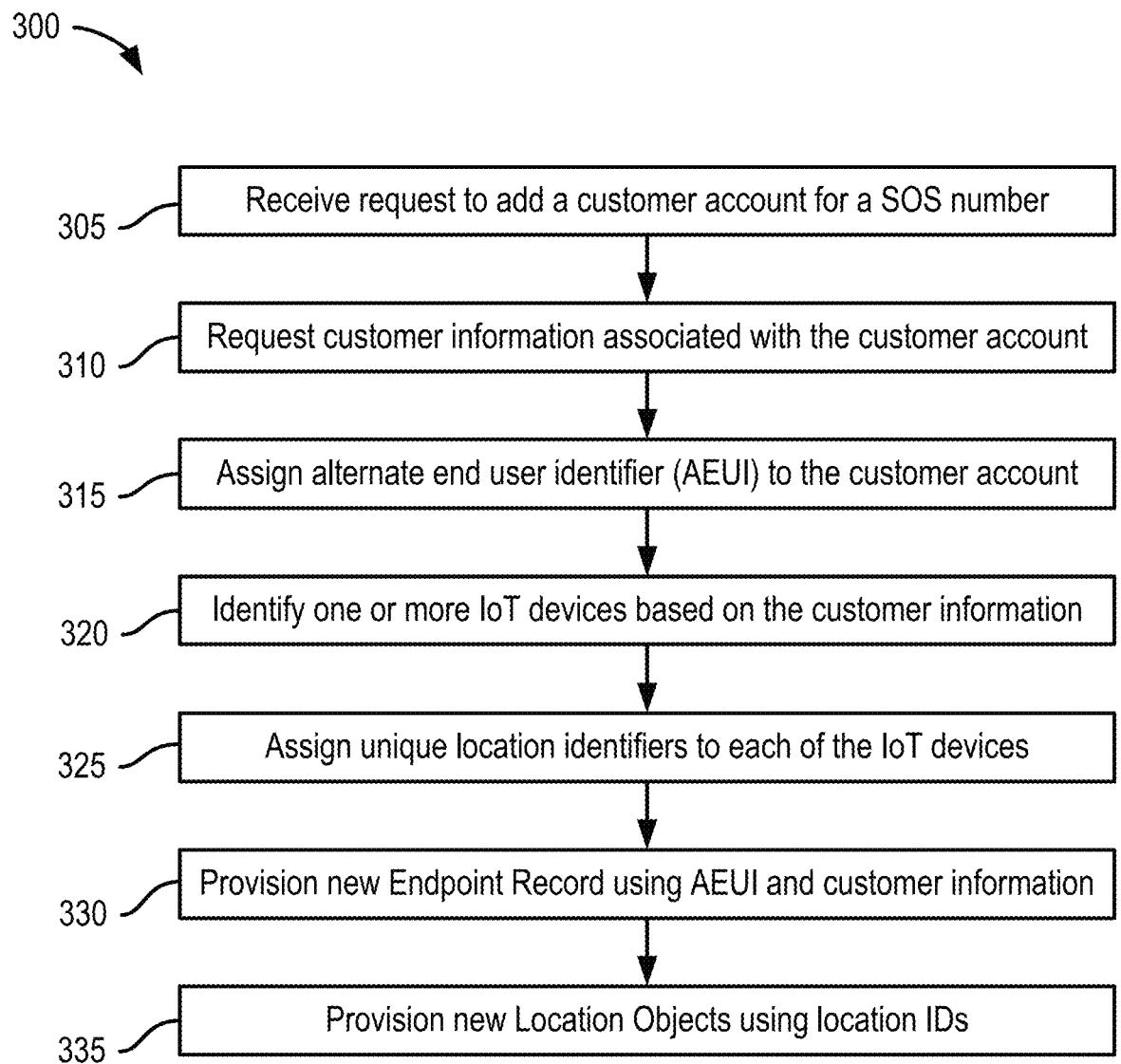
FIG. 3 shows an example method for provisioning emergency services for providing SOS call routing for emergency calls according to this disclosure.

Referring now to FIG. 3, which shows an example method 300 for provisioning emergency services for providing SOS call routing for emergency calls in a communications network (e.g., network 205). For example, an application provider (e.g., ASP 220) can provision emergency services for end user devices (e.g., IoT device 210 or telephony endpoint 215) associated with a customer account. In some examples, the steps shown in FIG. 3 may be implemented in program code that is executable by a processor, for example, the processor 245 or a processor in a general-purpose computer or server. In some embodiments, one or more steps shown in FIG. 3 may be omitted or performed in a different order. Similarly, additional steps not shown in FIG. 3 may also be performed. For illustrative purposes, the steps of the method 300 are described below with reference to components described above with regard to the system 200 shown in FIG. 2, but any suitable system according to this disclosure may be employed.

The method 300 begins at block 305, when the ASP 220 receives a request to add a customer account for a SOS number from an end user device (e.g., telephony endpoint 215). A user accesses an application or a website to send a request from the telephony endpoint 215 to obtain support for emergency services from the ASP 220 (e.g., via SOS logic server 225). The SOS logic server 225 may require authentication information to create or modify the customer account.

At block 310, the voice and messaging API platform 240 requests customer information associated with the customer account from the SOS logic server 225. In this example, the initial user request for support for emergency services is incomplete and does not include all of the customer information required by ASP 220. The SOS logic server 225 receives the request from the new user with incomplete customer information and requests the missing customer information, e.g., by sending a message to the user via telephony endpoint 215 with a notification that the customer account could not be created. In response, the user can enter and send the missing information to SOS logic server 225 via the application.

At block 315, the SOS logic server 225 assigns an AEUI to the customer account based on the customer information from block 310. For example, SOS logic server 225 receives the missing information and provisions support for emergency services by creating a new customer account with the assigned AEUI. The SOS logic server 225 can store the AEUI associated with the customer account in the user database 230 and transmit the AEUI to the emergency services TSP 235.

At block 320, the SOS logic server 225 identifies one or more additional devices based on the customer information from block 310. The SOS logic server 225 can identify these additional devices based on the customer information received from the requesting user, e.g., via telephony endpoint 215. The SOS logic server 225 may identify the telephony endpoint 215 based on the user request. Further, the request for support for emergency services may identify a second device (e.g., IoT device 210) or any number of IoT devices 210.

At block 325, the SOS logic server 225 assigns a unique location identifier (ID) to each of the one or more IoT devices associated with the customer account. The SOS logic server 225 assigns (e.g., provisions) an identifier (e.g., a LO) to the requesting telephony endpoint 215. The request for support for emergency services may include a request to add IoT device 210. In response, the SOS logic server 225 can assign a second LO to the IoT device 210. Further, the new user may request support for a second and/or third IoT devices 210, each of which can be assigned their own LO. The SOS logic server 225 can store assigned LOs in user database 230 and can monitor or track device locations using the assigned LOs. The SOS logic server 225 can transmit the LOs to the emergency services TSP 235.

At block 330, the voice and messaging API platform 240 provisions a new endpoint record using the AEUI and customer information. The SOS logic server 225 transmits the AEUI to the TSP 235 via voice and messaging API platform 240. The voice and messaging API platform 240 receives the AEUI and creates (e.g., provisions) new endpoint records for the new customer using the AEUI. The voice and messaging API platform 240 stores the AEUI in endpoint records database 255.

At block 335, the voice and messaging API platform 240 provisions new LOs using the unique location IDs. The voice and messaging API platform 240 receives new location records for devices associated with the new endpoint record from SOS logic server 225, which are used to provision location records. For example, voice and messaging API platform 240 can store LOs for the devices in the object location database 260. In some examples, location records may include customer, authentication, or location information, etc. Further, location information may include a LO, PIDF-LO, ALI, DNIS address, geolocation data, etc.

In some examples, the voice and messaging API platform 240 can assign a dynamic host configuration protocol (DHCP) address to an endpoint record associated with the IoT device 210. The voice and messaging API platform 240 can store the LO and DHCP address for IoT device 210 in the object location database 260. Further, voice and messaging API platform 240 can monitor a location of the IoT device 210 and update location information periodically (e.g., at regularly-scheduled time intervals). In some examples, SOS logic server 225 may request and obtain the provisioned DHCP address from the voice and messaging API platform 240 to monitor location information associated with the IoT device 210.

In some examples, the location information associated with the IoT device 210 can be monitored by the SOS logic server 225, voice and messaging API platform 240, or both. In some examples, voice and messaging API platform 240 can use the emergency services API 250 to provision the customer account (e.g., the endpoint records). In other examples, DLRS 275 may be tasked with provisioning the customer account. And in some examples, the DLRS 275 may include endpoint records database 255, object location database 260, or both. In some examples, the DLRS 275 can provision and retrieve information for emergency services, customer accounts, records, etc., according to any of the techniques described herein.

Once provisioned, the user is a registered customer of the ASP 220 and can use the application to request emergency services. The registered user can request emergency services via the application. In some examples, the registered user can request public safety services from a public service agency. The registered user may be a customer of both the ASP 220 and the emergency services TSP 235.

Figure 4:
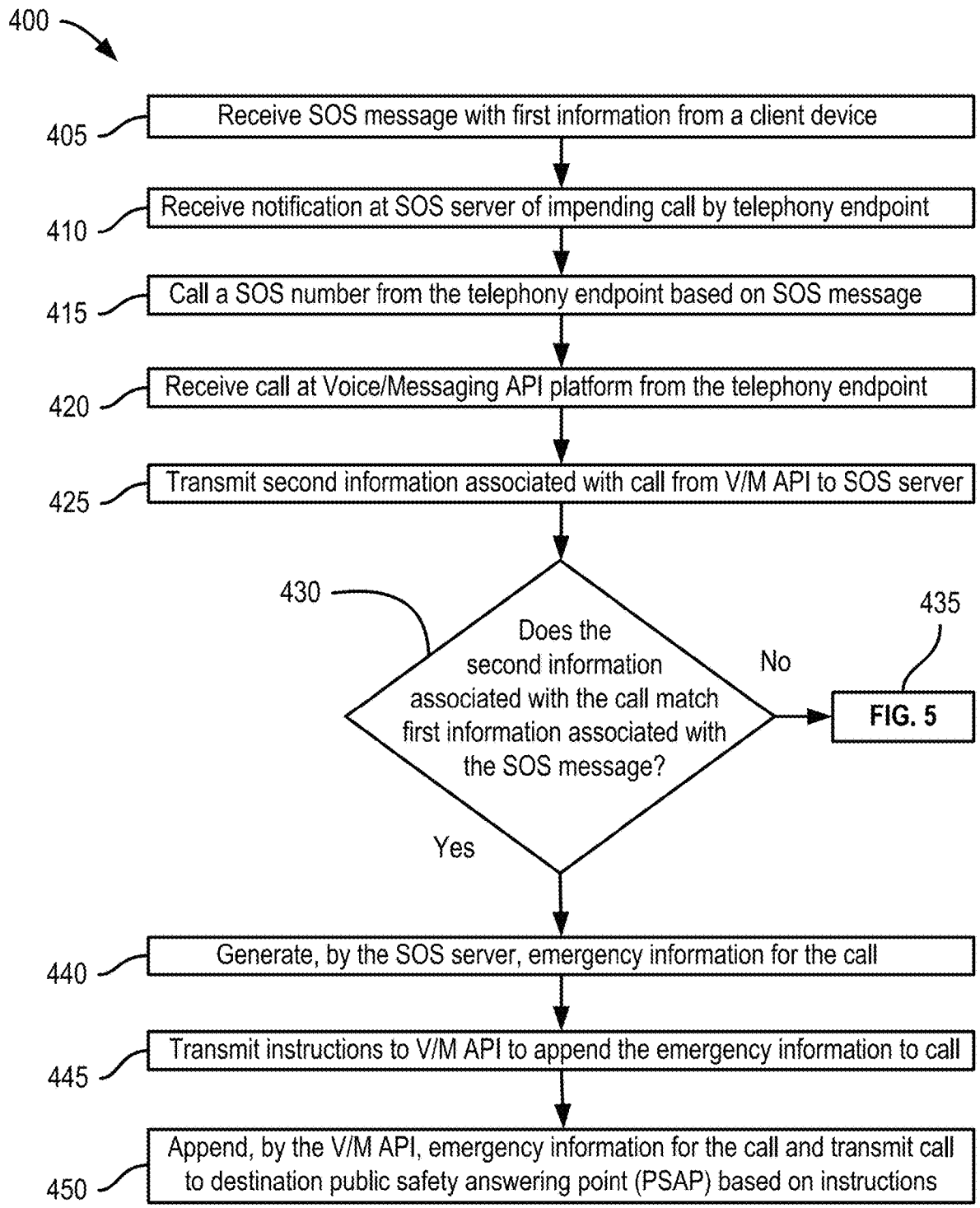
FIG. 4 shows an example method for providing SOS call routing for emergency calls according to this disclosure.

FIG. 4 shows an example method 400 for providing SOS call routing for emergency calls in a communications network (e.g., network 205). The steps shown in FIG. 4 may be implemented in program code executable by a processor, for example, the processor 245 or a processor in a general-purpose computer or server. In some embodiments, one or more steps shown in FIG. 4 may be omitted or performed in a different order. Additional steps not shown in FIG. 4 may also be performed. For illustrative purposes, the steps of the method 400 are described with reference to components described above with regard to the system 200 shown in FIG. 4, but any suitable system according to this disclosure may be employed.

The method 400 begins at block 405, when an application provider (e.g., ASP 220) receives an SOS message with first information from an end user device (e.g., telephony endpoint 215). For example, a user can press an SOS button on the telephony endpoint 215 that uses an application provided by ASP 220 to send the SOS message to SOS logic server 225. The SOS message includes first information, which may be an alert, notification, customer information, location information, user-generated message, audiovisuals, authentication information, etc.

In this example, the first information includes customer information. The SOS logic server 225 can identify the user as an authorized customer of the requested emergency services based on the customer information. Further, the SOS logic server 225 can retrieve additional customer information from user database 230 in preparation for an emergency call from the telephony endpoint 215. In some examples, the first information includes one or more requested emergency services.

At block 410, the SOS logic server 225 receives a notification of an impending call from a telephony endpoint (e.g., telephony endpoint 215). For example, the impending call may be an inbound emergency call to an ESN. In this example, the SOS message includes a notification for the impending call from telephony endpoint 215. Further, the notification may include customer information, location information, user-generated messages, audiovisuals, etc.

At block 415, the telephony endpoint 215 makes a call to a SOS number (e.g., the ESN) based on the SOS message. The telephony endpoint 215 can use emergency information derived from the SOS message to place a call to the ESN. Further, the emergency information can include a notification, which can indicate a type of the emergency call to make. Further, the telephony endpoint 215 can determine the appropriate ESN to call based on the type of emergency call. The telephony endpoint 215 calls the ESN using the cellular tower 285 and/or network 205. In some examples, telephony endpoint 215 may call a default ESN or ICE contact, which may be based on a user profile, preference, setting, selection, etc.

At block 420, the voice and messaging API platform 240 receives the call from the telephony endpoint 215. In some examples, the call from the telephony endpoint 215 can include second information associated with the call. Similar to the first information included in the copy of the SOS message that was sent to the SOS logic server 225, the telephony endpoint 215 can include the second information in the call to the voice and messaging API platform 240. For instance, the second information can include customer information, authentication information, emergency information, notifications, types of the emergency services, location information, etc. The voice and messaging API platform 240 can receive the call via router 280 or using any of the techniques described herein.

At block 425, the voice and messaging API platform 240 transmits second information associated with the call to the SOS logic server 225. In some examples, the voice and messaging API platform 240 can utilize a subset of all of the emergency information associated with the call to generate the second information. For example, the voice and messaging API platform 240 can determine the second information, which may include a subset of customer information, emergency information, notifications, types of emergency services, location information, etc. The voice and messaging API platform 240 can generate and transmit the second information for the call to the SOS logic server 225.

In some examples, emergency services API 250 or DLRS 275 may generate and transmit the second information.

Block 430 is a decision block, where the SOS logic server 225 determines whether the second information associated with the call matches the first information associated with the SOS message. For example, the first information and the second information may include customer information. The SOS logic server 225 may determine whether information associated with the call matches information associated with the SOS message by comparing the customer information that is present in the first information and the second information.

But in this example, at block 430, the SOS logic server 225 determines the first information matches the second information. For example, SOS logic server 225 can determine a match by comparing emergency information included in each of the first information from the IoT device 210 and the second information from the voice and messaging API platform 240. The SOS logic server 225 may determine the match using one or more of customer information, authentication information, emergency information, notifications, types of the emergency services, or location information. In this example, the SOS logic server 225 can transmit instructions to the voice and messaging API platform 240 based on the determination that the first information and second information match.

If the SOS logic server 225 determines that the first information matches the second information, the method proceeds to block 440. Alternatively, at block 430, the SOS logic server 225 may determine the first information and the second information do not match. In which case, the method proceeds to block 435. Block 435 is described in greater detail with respect to FIG. 5 below.

At block 440, the method 400 continues based on the determination made at block 430 that the first information matches the second information, in which case the SOS logic server 225 generates emergency information for the call. For example, the SOS logic server 225 can generate emergency information that includes location information associated with the SOS message. The location information can include a current location for IoT device 210, origination point for the SOS message, current location for telephony endpoint 215, registered address associated with the customer account, user-generated location information, etc.

In this example, the SOS logic server 225 generates emergency information for the call using first information from the SOS message. The emergency information may include a subset of information derived from the first information. The emergency information may also include location information, a type of emergency, identity of a user, age, gender, type of a residence (e.g., a single-family house, apartment, nursing home, etc.), etc. Further, emergency information may include any format described herein. The SOS logic server 225 can generate emergency information with the first information, second information, or both.

At block 445, the SOS logic server 225 transmits instructions to the voice and messaging API platform 240 to append the emergency information to the call. For example, the SOS logic server 225 can transmit emergency information to the voice and messaging API platform 240 with instructions to append the emergency information to the call. In some examples, SOS logic server 225 transmits emergency information and instructions to the voice and messaging API platform 240, emergency services API 250, DLRS 275, etc., or a combination of these.

At block 450, the voice and messaging API platform 240 appends the emergency information to the call and transmits the call (e.g., with the appended emergency information) to a destination PSAP 270 based on the instructions from the SOS logic server 225. In some examples, the voice and messaging API platform 240, processor 245, the router 280, emergency services API 250, or DLRS 275 may be used to receive the instructions with the emergency information and to append the emergency information to the emergency call. The voice and messaging API platform 240 appends the emergency information to the call and transmits the emergency call with the emergency information to the PSAP 270.

The PSAP 270 receives the emergency call and the emergency information from the voice and messaging API platform 240 and displays the emergency information. A dispatcher at the PSAP 270 receives the emergency call and views the emergency information. The dispatcher can dispatch an emergency service provider to locations based on the emergency information and/or the emergency call. For example, the dispatcher may determine emergency services are needed at a location of the SOS message based on the emergency information and send instructions to the emergency service provider to respond to an emergency at the location of the SOS message, e.g., the location of the IoT device 210.

In some examples, the location of the telephony endpoint 215 can include a current location (e.g., based on a PIDF-LO). The dispatcher may also determine the caller on the call needs emergency services. In this case, the dispatcher may use emergency information associated with a present location, e.g., using the PIDF-LO of the telephony endpoint 215 to dispatch emergency services. The dispatcher can determine whether the location of the call and the SOS message are the same location or whether emergency services are needed at two separate locations. The dispatcher can dispatch emergency services to either or both locations.

Figure 5:
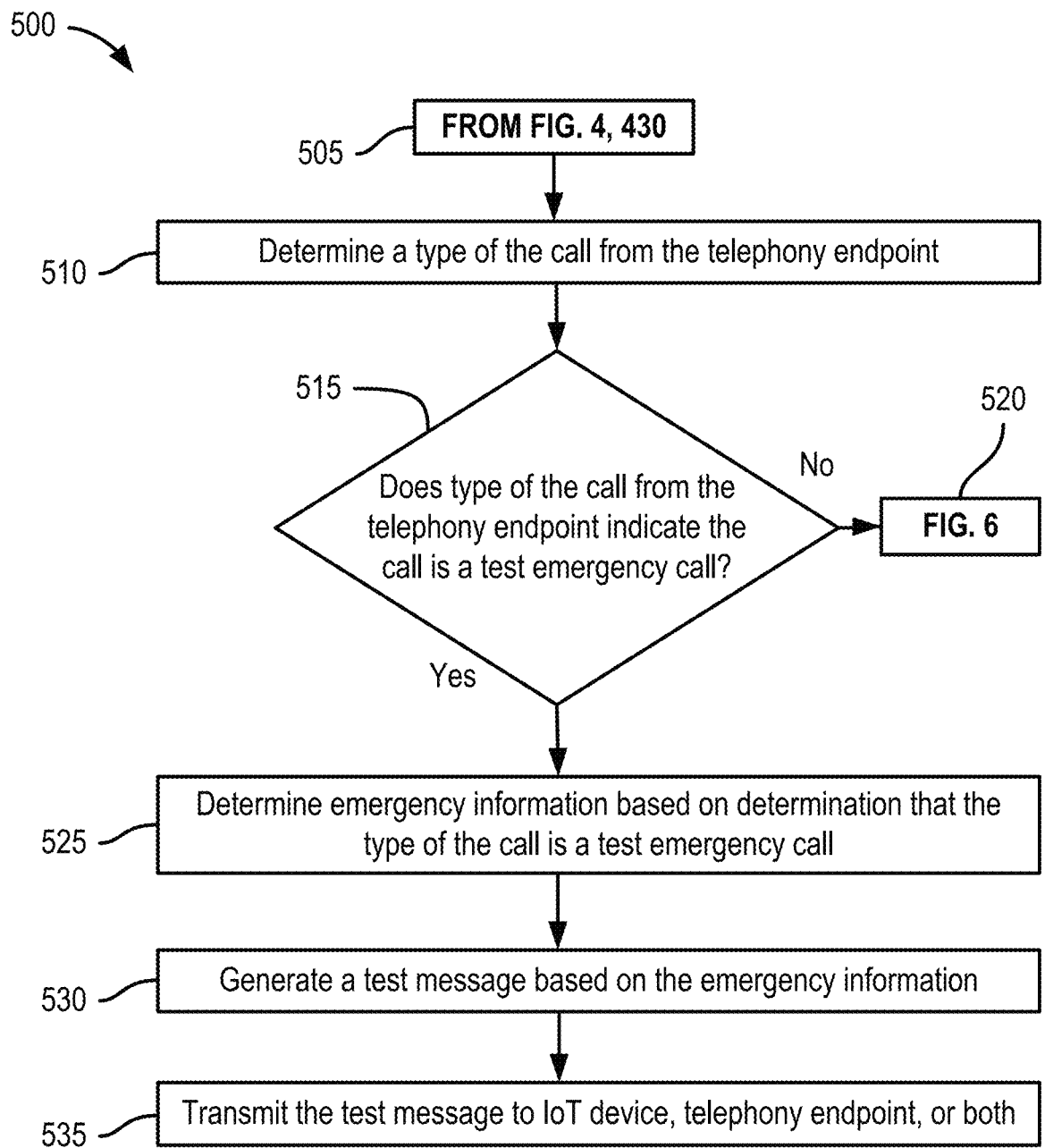
FIG. 5 shows another example method for providing SOS call routing for test calls according to this disclosure.

FIG. 5 shows an example method 500 shows another example method for providing SOS call routing for emergency calls in a communications network (e.g., network 205). In some examples, the steps shown in FIG. 5 may be implemented by program code that is executable by a processor, e.g., the processor 245 or a processor in a general-purpose computer or server. In some embodiments, one or more steps shown in FIG. 5 may be omitted or performed in a different order. Similarly, additional steps not shown in FIG. 5 may also be performed. For illustrative purposes, the steps of the method 500 are described below with reference to components described above with regard to the system 200 shown in FIG. 2, but any suitable system according to this disclosure may be employed.

The example method 500 begins at block 505 as a continuation from the determination made in block 430 shown in FIG. 4, when the SOS logic server 225 determines the first information and the second information do not match. In this case, the SOS logic server 225 makes the determination based on the first information and the second information as described above with respect to FIG. 4. In additional or alternative embodiments, the voice and messaging API platform 240 can make the determination.

At block 510, SOS logic server 225 determines a type of the call from the telephony endpoint 215. For example, SOS logic server 225 can use the second information from the voice and messaging API platform 240, e.g., received at block 425, to determine the type of the call. In additional or alternative embodiments, the voice and messaging API platform 240 may be capable of determining the type of the call from the telephony endpoint 215. For example, the voice and messaging API platform 240 may use emergency services API 250 to determine the type of the call based on emergency information or second information from the emergency call.

Block 515 is a decision block, where the SOS logic server 225 determines whether the type of the call from the telephony endpoint 215 is a test call based on the determination from block 510. To determine the type of the call, the SOS logic server 225 can analyze the contents of the SOS message and/or first information. The SOS logic server 225 may determine the call is a robocall, test call, pocket dial, misdial, false alarm, nuisance call, or another type of non-emergency call. In some examples, the SOS logic server 225 can determine the type of the call using any of the techniques described herein.

In this example, at block 515, the SOS logic server 225 determines the type of the call is a test call and the method proceeds to block 525. In one example, the SOS message received by the SOS logic server 225 may include a test notification from the IoT device 210. In some examples, a test notification may be included in the second information from the telephony endpoint 215. Further, the test notification may include an indication of a user-selected option for a test of the emergency services capabilities. In some examples, the SOS logic server 225 or voice and messaging API platform 240 can determine the type of the call is a test call based on the number dialed. For example, the SOS logic server 225 or voice and messaging API platform 240 may determine the type of the call based on the telephony endpoint 215 dialing a dedicated emergency test number such as 933.

Alternatively, at block 515, the SOS logic server 225 may determine the type of the call is not a test call. For example, the SOS logic server 225 can make the determination based on the second information as described above, with respect to FIG. 2, and proceeds to block 520. In additional or alternative embodiments, the voice and messaging API platform 240 may make the determination. Block 520 is described in greater detail with respect to FIG. 6 below.

At block 525, the SOS logic server 225 determines emergency information based on the determination that the type of the call is a test call. The SOS logic server 225 can determine the emergency information in a substantially similar manner as described above with respect to block 440 of FIG. 4. The SOS logic server 225 can generate emergency information in response to the request to test the emergency services. Further, SOS logic server 225 can generate a test message using the emergency information and may include a notification or alert.

In some examples, the SOS logic server 225 can transmit test emergency information (e.g., a test notification or the test message) to the voice and messaging API platform 240. In some examples, the voice and messaging API platform 240 may determine the call is a test call based on the test emergency information received from the SOS logic server 225. In other examples, the voice and messaging API platform 240 determines the call is a test call based on the reception of an inbound test call from telephony endpoint 215.

At block 530, the SOS logic server 225 generates a test message based on the emergency information. In some examples, the test message can include notification information that the test was successful. A successful test call may include a call that resulted in a VoIP connection to the voice and messaging API platform 240, generation and reception of emergency information from the voice and messaging API platform 240 from the SOS logic server 225, availability of or connectivity with a destination PSAP 270, etc., or a combination of these. The voice and messaging API platform 240 can generate and transmit an ACK message to the SOS logic server 225 based on the receipt of the either the test call or test emergency information. In this example, the SOS logic server 225 receives the ACK message and generates additional emergency information (e.g., a record of the ACK or a confirmation message) associated with the emergency test request.

In some examples, SOS logic server 225 may request confirmation of connectivity with the PSAP 270 before generating the test message. For example, the SOS logic server 225 can send a connectivity test request to the voice and messaging API platform 240. In response, the voice and messaging API platform 240 may verify connectivity by testing the connection and transmitting a confirmation message to the SOS logic server 225 with the connectivity test results. The SOS logic server 225 can send the test message and the results to the IoT device 210, telephony endpoint 215, or both. In some examples, the SOS logic server 225 can send the test message to the voice and messaging API platform 240. Further, SOS logic server 225 can store a record of test results in the user database 230.

At block 535, the SOS logic server 225 transmits the test message to the IoT device 210, the telephony endpoint 215, or both. In some examples, the SOS logic server 225 may also send a record of the test results to the voice and messaging API platform 240. In this example, the SOS logic server 225 sends the test message to the voice and messaging API platform 240. The voice and messaging API platform 240 can store the record of the test results, e.g., in endpoint records database 255.

Figure 6:
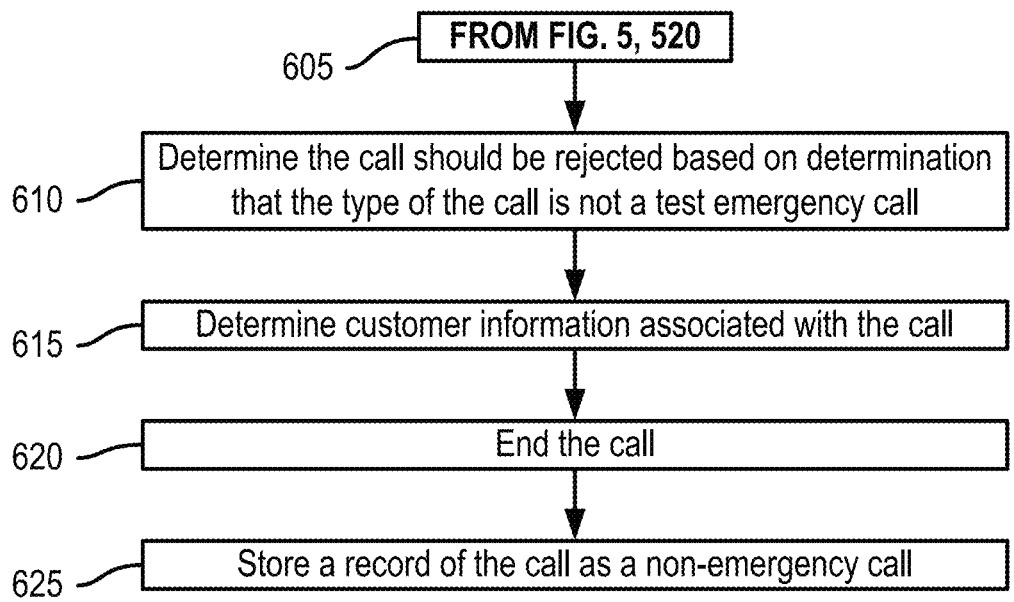
FIG. 6 shows another example method for providing SOS call routing for non-emergency calls according to this disclosure.

FIG. 6 shows another example method 600 for providing SOS call routing for emergency calls in a communications network (e.g., network 205). In some examples, the steps shown in FIG. 6 may be implemented in program code that is executable by a processor, for example, the processor 245 or a processor in a general-purpose computer or server. In some embodiments, one or more steps shown in FIG. 6 may be omitted or performed in a different order. Similarly, additional steps not shown in FIG. 6 may also be performed. For illustrative purposes, the steps of the method 600 are described below with reference to components described above with regard to the system 200 shown in FIG. 2, but any suitable system according to this disclosure may be employed.

The example method 600 begins as a continuation from the determination made in block 520 shown in FIG. 5, starting at block 605, when the SOS logic server 225 determines the type of the call is not a test call. As described above, in additional or alternative embodiments, the voice and messaging API platform 240 can also determine the type of the call. But in this example, the SOS logic server 225 determines the type of the call is not a test call (e.g., a non-emergency call). In one example, the SOS logic server 225 can determine the type of the call is a robocall, e.g., based on one or more call features.

The SOS logic server 225 can determine the presence of an automated voice, unrecognized or unknown third party information, usage of an unauthorized device, origination location, etc., or a combination of these. Further, the SOS logic server 225 can determine call information or a caller ID that may be associated with a previously identified robocall. In one example, the SOS logic server 225 can determine the call includes a spoofed phone number based on a CBN does not match customer information associated with a known customer account. Thus, the SOS logic server 225 determine the call from the spoofed phone number is a robocall.

At block 610, the SOS logic server 225 determines the call should be rejected based on the determination that the type of the call is not a test call. In additional or alternative embodiments, the voice and messaging API platform 240 may determine the call should be rejected after determining the type of the call is a non-emergency call or a robocall. In one example, the SOS logic server 225 determines the type of the call is a robocall based on the usage of a spoofed CBN that is assigned to the telephony endpoint 215 and determines the call should be rejected. Further, the SOS logic server 225 can generate a call record associated with the robocall and store the call record in the user database 230. The SOS logic server 225 can also transmit the call record and a recommendation to reject the call to the voice and messaging API platform 240.

At block 615, the voice and messaging API platform 240 determines customer information associated with the call based on information from block 610. The voice and messaging API platform 240 receives the call record and recommendation to reject the call from SOS logic server 225. The voice and messaging API platform 240 determines customer information associated with the call by retrieving the customer account from endpoint records database 255.

At block 620, the voice and messaging API platform 240 ends the call. In this example, the voice and messaging API platform 240 ends the non-emergency call after determining the type of call is a non-emergency call. In some examples, the voice and messaging API platform 240 may end the call after determining the type of the call is a robocall. In other examples, voice and messaging API platform 240 can end the call based on the recommendation from the SOS logic server 225 alone.

At block 625, the voice and messaging API platform 240 stores a record of the call as a non-emergency call. In some examples, the voice and messaging API platform 240 can stores record of the type of the call. For example, the voice and messaging API platform 240 may distinguish call records as being a robocall, pocket dial, misdial, false alarm, another classification of the call, etc. The voice and messaging API platform 240 transmit a record of the non-emergency call to the SOS logic server 225. In addition, the voice and messaging API platform 240 may also transmit the record of the non-emergency call to the IoT devices 210, telephony endpoint 215, or both. In some examples, the SOS logic server 225 can also store a record of the non-emergency call in user database 230. While the example method 600 is described in the context of FIGS. 4 and 5, it should be appreciated that the SOS logic server 225 or the voice and messaging API platform 240 can determine the type of the call is neither an emergency call or a test call (e.g., a robocall) in additional or alternative sequences.

Although the above operations are described sequentially, many of the operations can be performed in parallel or concurrently. In addition, the order of the operations may be rearranged. A process may have additional steps not included in the FIGS. 3-6. Furthermore, examples of the methods may be implemented by hardware, software, firmware, middleware, microcode, hardware description languages, or any combination thereof. When implemented in software, firmware, middleware, or microcode, the program code or code message segments to perform the necessary tasks may be stored in a non-transitory computer-readable medium such as a storage medium. Processors may perform the described tasks.

Figure 7:
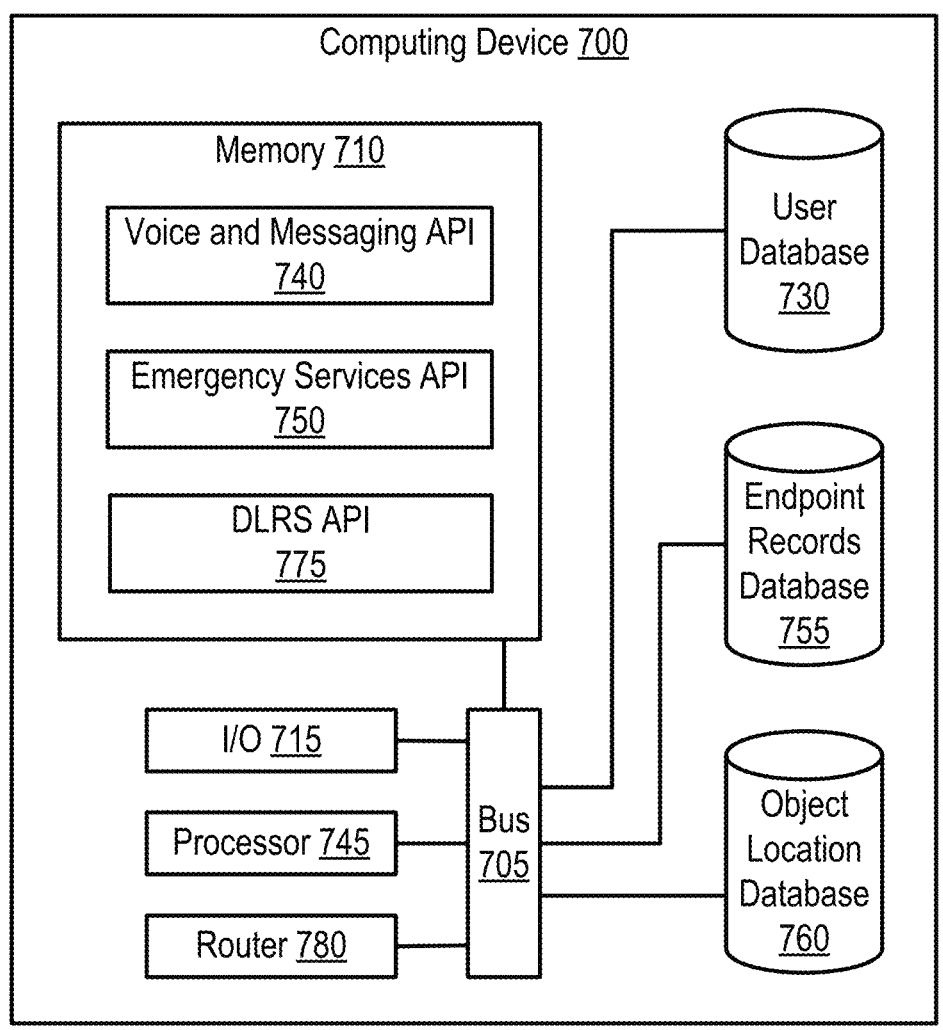
FIG. 7 shows an example computing device suitable for use with example systems for SOS call routing according to this disclosure.

FIG. 7 shows an example of a computing device 700 suitable for use with any of the examples described above. The example computing device 700 may be, for example, any of SOS logic servers 125, 225, voice and messaging API platform 140, 240, a computer, or any other type of suitable computing device. In some examples, the computing device 700 can be any suitable computing device for receiving and sending messages according to the techniques described herein.

The computing device 700 includes a processor 745 communicatively coupled to other hardware via a bus 705. The processor 745 can include one or more commercially available processors, embedded processors, secure processors, microprocessors, dual microprocessors, multi-core processors, other multi-processor architectures, another suitable processing device, or any combination of these. A memory 710, which can be any suitable tangible (and non-transitory) computer-readable medium such as random access memory (RAM), read-only memory (ROM), erasable and electronically programmable read-only memory (EEPROMs), or the like, embodies program components that configure operation of the computing device 700. In the embodiment shown, computing device 700 further includes a user database 730, endpoint records database 755, and object location database 760, each of which may include any or all of their respective features described herein. The computing device 700 also includes one or more input/output (I/O) interface components 715 and a router 780.

Router 780 can include one or more network interface devices or any components that facilitate a network connection. Examples include, but are not limited to, gateways, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, GPRS, EDGE, EV-DO, SVDO, UMTS, HSDPA, HSUPA, HSPA+, LTE, LTE Advanced, 5G, 5G NR, WiMAX, Wi-Fi, or other mobile communications network).

I/O components 715 may be used to facilitate wired or wireless connections to devices such as one or more displays, game controllers, keyboards, mice, joysticks, cameras, buttons, speakers, microphones and/or other hardware used to input or output data. Memory 710 represents non-volatile storages such as magnetic, optical, or other storage media included in computing device 700 and/or coupled to processor 745.

In some embodiments, the computing device 700 includes a user database 730, endpoint records database 755, and object location database 760. The user database 730 may include information related to authorized users or particular client devices associated with the computing device 700. For example, the user database 730 may include profile information such as user information (e.g., a user's name, contact information, a mailing address, a telephone number, personal information, usage data, etc.), authentication information (e.g., a username, a password, a PIN, etc.), billing information (e.g., a billing rate, a billing address, account information, a level of service associated with an account, etc.), a network address (e.g., a most recent IP address, a home IP address, a work IP address, etc.).

In some examples, the processor 745 may execute program code or instructions stored in memory 710 (e.g., emergency services API 750, voice and messaging API 740, and/or DLRS API 775). In some examples, the processor 745 may execute program code or instructions for the voice and messaging API 740, emergency services API 750, and/or DLRS API 775 stored in memory 710.

It should be appreciated that computing device 700 may also include additional processors, additional storage, and a computer-readable medium (not shown). The processor(s) 745 may execute additional computer-executable program instructions stored in memory 710. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

Certain aspects and features of the present disclosure involve systems capable of providing SOS call routing for emergency calls in a communications network with which a user may send or receive message. The methods, devices, and systems described above are examples. Various configurations may omit, substitute, or add various procedures or components. For example, in alternative configurations, the methods may be performed in a different order. In another example, the methods may be performed with fewer steps, more steps, or in combination. In addition, certain configurations may be combined in various configurations. As technology evolves, many of the elements are examples and do not limit the scope of the disclosure or claims.

While some examples of methods, devices, and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. A computing system comprising:
   a plurality of computing devices, each computing device comprising:
   a non-transitory computer-readable medium; and
   a processor in communication with the non-transitory computer-readable medium, the processor configured to execute instructions stored in the non-transitory computer-readable medium,
   wherein the plurality of computing devices are collectively configured to:
   receive, by a first computing device of the plurality of computing devices, a SOS message from a telephony endpoint, the SOS message comprising identification information associated with the telephony endpoint;
   retrieve, by the first computing device, location information associated with an Internet of things (IoT) device based on the SOS message;

receive, by a second computing device of the plurality of computing devices, a telephone call from the telephony endpoint, the telephone call comprising call information;

receive, by the first computing device and from the second computing device, a notification of the telephone call from the telephony endpoint, the notification comprising the call information associated with the telephone call;

verify, by the first computing device, the telephone call is associated with the SOS message based on the identification information and the call information; and upon verification, generate, by the first computing device, instructions for the second computing device, wherein the instructions include forwarding the telephone call to a public safety answering point (PSAP), and wherein the telephone call includes emergency information comprising the location information associated with the IoT device and callback information associated with the IoT device;

receive, by the second computing device, the instructions from the first computing device; and forward, by the second computing device, the telephone call with the emergency information to the PSAP, wherein the PSAP services a location associated with the IoT device.

2. The computing system of claim 1, wherein the telephony endpoint is configured to: (i) execute an application configured to receive and present a trigger event notification from the IoT device communicable with the application, (ii) transmit the SOS message to the first computing device, and (iii) place the telephone call to the second computing device.

3. The computing system of claim 1, wherein the first computing device is an application server and the second computing device is an emergency services platform server.

4. The computing system of claim 1, wherein the IoT device is remote from the telephony endpoint.

5. The computing system of claim 4, wherein the IoT device automatically causes the SOS message to be sent based on a sensor signal.

6. The computing system of claim 1, wherein the call information comprises an alternate end user identification (AEUI), an automatic number identification (ANI) number or a dialed number identification service (DNIS) name.

7. The computing system of claim 6, wherein the callback information associated with the IoT device comprises the AEUI comprising a name and a call back number (CBN).

8. The computing system of claim 7, the first computing device configured to:
generate an emergency call confirmation message when the telephone call has been verified to be associated with the SOS message; and
transmit the emergency call confirmation message to the second computing device.

9. A method comprising:
receiving, by a first computing device of a plurality of computing devices, a SOS message from a telephony endpoint, the SOS message comprising identification information associated with the telephony endpoint;
retrieving, by the first computing device, location information associated with an IoT device based on the SOS message;
receiving, by a second computing device of the plurality of computing devices, a telephone call from the telephony endpoint, the telephone call comprising call information;

receiving, by the first computing device and from the second computing device, a notification of the telephone call from the telephony endpoint, the notification comprising call information associated with the telephone call;

verifying, by the first computing device, the telephone call is associated with the SOS message based on the identification information and the call information;

generating, by the first computing device, instructions for the second computing device, wherein the instructions include forwarding the telephone call to a public safety answering point (PSAP), and wherein the telephone call includes emergency information comprising the location information associated with the IoT device and callback information associated with the IoT device;

receiving, by the second computing device, the instructions from the first computing device; and forwarding, by the second computing device, the telephone call with the emergency information to the PSAP.

10. The method of claim 9, wherein the telephony endpoint is configured to: (i) execute an application configured to receive and present a trigger event notification from the IoT device communicable with the application, (ii) transmit the SOS message to the first computing device, and (iii) place the telephone call to the second computing device.

11. The method of claim 9, wherein the IoT device is remote from the telephony endpoint, and wherein the IoT device automatically causes the SOS message to be sent based on a sensor signal.

12. The method of claim 9, further comprising:
generating, by the first computing device, an emergency call confirmation message when the telephone call has been verified to be associated with the SOS message; and
transmitting, by the first computing device, the emergency call confirmation message to the second computing device.

13. The method of claim 9, wherein the call information comprises an alternate end user identification (AEUI), an automatic number identification (ANI) number or a dialed number identification service (DNIS) name.

14. The method of claim 13, wherein the callback information associated with the IoT device comprises the AEUI comprising a name and a call back number (CBN).

15. A non-transitory computer-readable medium comprising program code executable by a processor to cause the processor to:
receive a SOS message from a telephony endpoint, the SOS message comprising first location information and identification information associated with a telephony endpoint;
retrieve location information associated with an IoT device based on the SOS message;
receive a notification of a telephone call from the telephony endpoint from a remote computing device, the notification comprising call information associated with the telephone call;
verify the telephone call is associated with the SOS message based on the identification information and the call information;
upon verification, generate instructions for the remote computing device, wherein the instructions include forwarding the telephone call to a public safety answering point (PSAP), and wherein the telephone call includes emergency information comprising the location information associated with the IoT device and callback information associated with the IoT device; and transmit the instructions to the remote computing device.

16. The non-transitory computer-readable medium of claim 15, wherein the telephony endpoint is configured to: (i) execute an application configured to receive and present a trigger event notification from the IoT device communicable with the application, (ii) transmit the SOS message to the first computing device, and (iii) place the telephone call to the second computing device.

17. The non-transitory computer-readable medium of claim 15, wherein the IoT device is remote from the telephony endpoint, and wherein the IoT device automatically causes the SOS message to be sent based on a sensor signal.

18. The non-transitory computer-readable medium of claim 15, further comprising program code executable by the processor to cause the processor to:
generate an emergency call confirmation message based verification the telephone call is associated with the SOS message; and
transmit the emergency call confirmation message to the remote computing device.

19. The non-transitory computer-readable medium of claim 15, wherein the call information comprises an alternate end user identification (AEUI), an automatic number identification (ANI) number or a dialed number identification service (DNIS) name.

20. The non-transitory computer-readable medium of claim 19, wherein the callback information associated with the IoT device comprises the AEUI comprising a name and a call back number (CBN).

* * * * *